(12) United States Patent
Botman et al.

(10) Patent No.: US 11,294,787 B2
(45) Date of Patent: Apr. 5, 2022

(54) APPARATUS AND METHOD FOR CONTROLLING ASSERTION OF A TRIGGER SIGNAL TO PROCESSING CIRCUITRY

(71) Applicant: ARM LIMITED, Cambridge (GB)

(72) Inventors: François Christopher Jacques Botman, Cambridge (GB); Thomas Christopher Grocutt, Cambridge (GB); John Michael Horley, Hauxton (GB); Michael John Williams, Ely (GB)

(73) Assignee: ARM Limited, Cambridge (GB)

( * ) Notice: Subject to any disclaimer, the term of this patent is extended or adjusted under 35 U.S.C. 154(b) by 198 days.

(21) Appl. No.: 16/321,503

(22) PCT Filed: Aug. 10, 2017

(86) PCT No.: PCT/GB2017/052363
§ 371 (c)(1),
(2) Date: Jan. 29, 2019

(87) PCT Pub. No.: WO2018/042149
PCT Pub. Date: Mar. 8, 2018

(65) Prior Publication Data
US 2019/0163601 A1    May 30, 2019

(30) Foreign Application Priority Data
Aug. 31, 2016  (GB) ..................... 1614752

(51) Int. Cl.
*G06F 11/36* (2006.01)
*G06F 11/34* (2006.01)
(Continued)

(52) U.S. Cl.
CPC .......... *G06F 11/348* (2013.01); *G06F 11/364* (2013.01); *G06F 11/3636* (2013.01);
(Continued)

(58) Field of Classification Search
CPC ............. G06F 11/3636; G06F 11/3471; G06F 11/3466; G06F 11/348; G06F 11/364;
(Continued)

(56) References Cited

U.S. PATENT DOCUMENTS 5,659,679 A  *  8/1997  Alpert ................. G06F 11/3636
                                                        712/227
5,740,413 A      4/1998  Alpert et al.
(Continued)

FOREIGN PATENT DOCUMENTS

CN        102171650       8/2011
GB        2 393 272       3/2004
(Continued)

OTHER PUBLICATIONS

International Search Report and Written Opinion of the ISA for PCT/GB2017/052363, dated Oct. 27, 2017, 15 pages.
(Continued)

*Primary Examiner* — William B Partridge
*Assistant Examiner* — Courtney P Carmichael-Moody
(74) *Attorney, Agent, or Firm* — Nixon & Vanderhye P.C.

(57) ABSTRACT

An apparatus and method are provided to control assertion of a trigger signal to processing circuitry. The apparatus has evaluation circuitry to receive program instruction execution information indicative of a program instruction executed by the processing circuitry, which is arranged to perform an evaluation operation to determine with reference to evaluation information whether the program instruction execution information indicates presence of a trigger condition. Trigger signal generation circuitry is used to assert a trigger signal to the processing circuitry in dependence on whether the trigger condition is determined to be present. Further, filter circuitry is arranged to receive event information indicative of at least one event occurring within the pro- (Continued)

cessing circuitry, and is arranged to determine with reference to filter control information and that event information whether a qualifying condition is present. The filter circuitry is arranged, on determining that the qualifying condition is not present, to prevent the presence of the trigger condition being notified to the trigger signal generation circuitry. This allows the monitoring of particular program instruction execution behaviour to be qualified so that the processing circuitry is only notified if in addition a qualifying event is determined to be present.

16 Claims, 8 Drawing Sheets

(51) Int. Cl.
 *G06F 9/30* (2018.01)
 *G06F 9/38* (2018.01)
(52) U.S. Cl.
 CPC ........ *G06F 11/3656* (2013.01); *G06F 9/3005* (2013.01); *G06F 9/3867* (2013.01); *G06F 11/3648* (2013.01); *G06F 2201/86* (2013.01); *G06F 2201/865* (2013.01)
(58) Field of Classification Search
 CPC ..... G06F 11/3648; G06F 9/3836–3842; G06F 9/3867; G06F 9/3806; G06F 2201/86; G06F 9/3005; G06F 11/3656
 See application file for complete search history.

(56) References Cited

U.S. PATENT DOCUMENTS

| | | | |
|---|---|---|---|
| 6,158,023 A | 12/2000 | Ubukata et al. | |
| 6,463,553 B1 * | 10/2002 | Edwards | G06F 11/3636 |
| | | | 714/31 |
| 6,748,558 B1 * | 6/2004 | Gonzales | G06F 11/3409 |
| | | | 702/182 |
| 7,865,704 B2 * | 1/2011 | Moyer | G06F 11/36 |
| | | | 712/227 |
| 2003/0084272 A1 | 5/2003 | Hill | |
| 2005/0066153 A1 * | 3/2005 | Sharangpani | G06F 9/322 |
| | | | 712/239 |
| 2005/0257089 A1 * | 11/2005 | Williams | G06F 11/3648 |
| | | | 714/34 |
| 2009/0043993 A1 * | 2/2009 | Ford | G06F 11/30 |
| | | | 712/216 |
| 2015/0220465 A1 | 8/2015 | Kennedy et al. | |
| 2019/0370149 A1 * | 12/2019 | Botman | G06F 11/3636 |

FOREIGN PATENT DOCUMENTS

| | | |
|---|---|---|
| JP | H07-095316 | 10/1995 |
| JP | H09-319607 | 12/1997 |
| JP | 2000-181746 | 6/2000 |
| JP | 2004-178590 | 6/2004 |
| JP | 2005-317023 | 11/2005 |
| JP | 2007-257441 | 10/2007 |
| JP | 5949372 | 7/2016 |
| TW | 201428624 | 7/2014 |
| WO | 2007/099273 | 9/2007 |

OTHER PUBLICATIONS

Search Report for GB1614752.2, dated Feb. 6, 2017, 6 pages.
Office Action for EP Application No. 17752466.7 dated May 11, 2020, 5 pages.
Office Action for TW Application No. 106127747 dated Apr. 7, 2021 and English translation, 21 pages.
Office Action for KR Application No. 10-2019-7008310 dated Aug. 4, 2021 and English translation, 16 pages.
Office Action for JP Application No. 2019-510437 dated Sep. 7, 2021 and English translation, 7 pages.

* cited by examiner

APPARATUS AND METHOD FOR CONTROLLING ASSERTION OF A TRIGGER SIGNAL TO PROCESSING CIRCUITRY

This application is the U.S. national phase of International Application No. PCT/GB2017/052363 filed 10 Aug. 2017, which designated the U.S. and claims priority to GB Patent Application No. 1614752.2 filed 31 Aug. 2016, the entire contents of each of which are hereby incorporated by reference.

The present technique relates to an apparatus and a method for controlling assertion of a trigger signal to processing circuitry.

It is known to provide processing circuitry with associated monitoring circuitry that can be arranged to receive program instruction execution information from the processing circuitry. The monitoring circuitry can be programmed with certain information values to be monitored, and by analysing the program instruction execution information received from the processing circuitry with reference to those programmed information values, it can determine when to assert a trigger signal back to the processing circuitry.

As an example, the monitoring circuitry may take the form of watchpoint circuitry having one or more programmed watchpoint values, and by monitoring the received program instruction execution information it can determine when those watchpoint values are detected, and assert a watchpoint signal back to the processing circuitry. The processing circuitry can then take a predetermined action in response to the watchpoint signal, for example by taking an interrupt to execute an appropriate exception routine.

As processing circuits increase in complexity, and in the functionality that they support, it would be desirable to improve the functionality of such monitoring circuits to allow more complex behaviour of the processing circuitry to be monitored.

In one example configuration, there is provided an apparatus, comprising: evaluation circuitry to receive program instruction execution information indicative of a program instruction executed by processing circuitry, and to perform an evaluation operation to determine with reference to evaluation information whether the program instruction execution information indicates presence of a trigger condition; trigger signal generation circuitry to assert a trigger signal to the processing circuitry in dependence on whether said trigger condition is determined to be present; and filter circuitry to receive event information indicative of at least one event occurring within the processing circuitry, and to determine with reference to filter control information and said event information whether a qualifying condition is present; the filter circuitry being arranged, on determining that the qualifying condition is absent, to prevent the presence of the trigger condition being notified to the trigger signal generation circuitry.

In another example configuration, there is provided a method of operating an apparatus to control assertion of a trigger signal to processing circuitry, comprising: receiving program instruction execution information indicative of a program instruction executed by the processing circuitry, and performing an evaluation operation to determine with reference to evaluation information whether the program instruction execution information indicates presence of a trigger condition; asserting a trigger signal to the processing circuitry in dependence on whether said trigger condition is determined to be present; receiving event information indicative of at least one event occurring within the processing circuitry, and determining with reference to filter control information and said event information whether a qualifying condition is present; and on determining that the qualifying condition is absent, preventing the presence of the trigger condition being taken into account when determining whether to assert the trigger signal.

In a yet further example configuration, there is provided an apparatus, comprising: evaluation means for receiving program instruction execution information indicative of a program instruction executed by processing circuitry, and for performing an evaluation operation to determine with reference to evaluation information whether the program instruction execution information indicates presence of a trigger condition; trigger signal generation means for asserting a trigger signal to the processing circuitry in dependence on whether said trigger condition is determined to be present; and filter means for receiving event information indicative of at least one event occurring within the processing circuitry, and for determining with reference to filter control information and said event information whether a qualifying condition is present; the filter means further, on determining that the qualifying condition is absent, for preventing the presence of the trigger condition being notified to the trigger signal generation means.

The present technique will be described further, by way of example only, with reference to embodiments thereof as illustrated in the accompanying drawings, in which.

Figure 1:
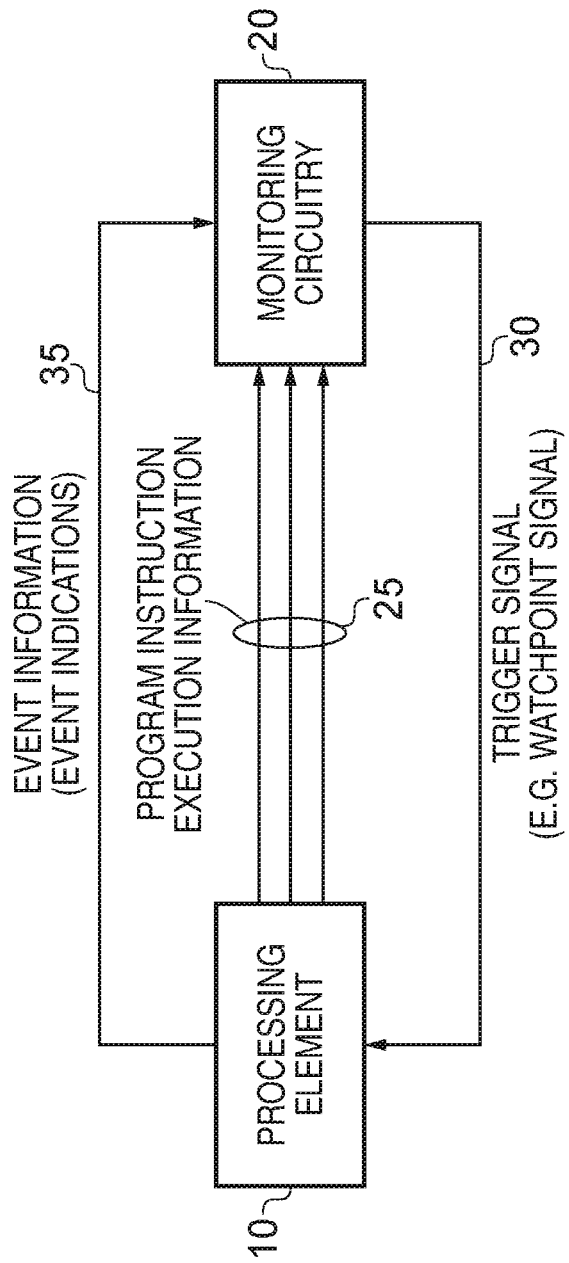
FIG. 1 is a block diagram of a system including monitoring circuitry in accordance with one embodiment.

Before discussing the embodiments with reference to the accompanying figures, the following description of embodiments is provided.

In one embodiment, an apparatus is provided that comprises evaluation circuitry to receive program instruction execution information from an associated processing circuitry, that program instruction execution information being indicative of program instructions executed by the processing circuitry. The evaluation circuitry is then arranged to perform an evaluation operation to determine with reference to evaluation information whether the program instruction execution information indicates presence of a trigger condition. In one embodiment, the evaluation information can be preprogrammed into the evaluation circuitry to identify what values of program instruction execution information, or ranges of values of program instruction execution information, are to be determined as indicating the presence of a trigger condition.

The apparatus also includes trigger signal generation circuitry to assert a trigger signal to the processing circuitry in dependence on whether the trigger condition is determined to be present. In one embodiment, there may be multiple instances of the evaluation circuitry, and the trigger signal generation circuitry may take into account the signals received from each of those evaluation circuits when determining whether to assert a trigger signal.

The apparatus of one embodiment further includes filter circuitry to receive event information indicative of at least one event occurring within the processing circuitry, and is arranged to determine with reference to filter control information and that event information whether a qualifying condition is present. As with the evaluation information, in one embodiment the filter control information can be pre-programmed in advance, and is used to identify any events that need to be present in order to determine that the qualifying condition is present.

The filter circuitry is then arranged, on determining that the qualifying condition is absent, to prevent the presence of the trigger condition being notified to the trigger signal generation circuitry. As a result, the filter circuitry can act to filter which instances of detection of the presence of the trigger condition by the evaluation circuitry are actually notified to the trigger signal generation circuitry, by making a notification of the trigger condition to the trigger signal generation circuitry dependent on whether any event restriction imposed by the filter circuitry is also met.

This provides a very powerful mechanism for monitoring complex combinations of behaviour within the associated processing circuitry, and issuing trigger signals accordingly. In particular, the program instruction execution information will typically provide information that is a direct consequence of execution of a program instruction. In one example, the program instruction execution information provides at least one of: an instruction address of the program instruction executed by the processing circuitry; an address of a data value accessed when executing the program instruction; and a data value accessed when executing the program instruction.

In contrast, the event information can take a wide variety of different forms and relate to events that are not directed defined by execution of the program instruction being evaluated by the evaluation circuitry. The event information hence for example may include information about any desired number of architectural or micro-architectural events, with the filter control information being settable so that when the received program instruction execution information would cause the evaluation circuitry to determine presence of a trigger condition, this is in fact only notified to the trigger signal generation circuitry if at least one architectural or micro-architectural event encoded into the filter control information is also present.

There are many examples of where such an approach can provide significant benefits. For example, in one embodiment, the processing circuitry may be arranged to execute a sequence of program instructions, said sequence including a branch behaviour setting program instruction that indicates an identified program instruction within said sequence, execution of the branch behaviour setting program instruction enabling a branch behaviour to be associated with said identified program instruction that causes the processing circuitry to branch to a target address identified by the branch behaviour setting program instruction when the identified program instruction is encountered in said sequence. In such an embodiment, an event indicated by the event information may identify when a branch has been taken by the processing circuitry on encountering said identified program instruction due to a previous execution of the branch behaviour setting program instruction.

By way of specific example, it will be appreciated that in such an embodiment, the evaluation circuitry and filter circuitry may be arranged so that the evaluation circuitry monitors the program instruction execution information to determine when the identified program instruction is encountered in the program sequence, but the trigger signal generation circuitry will only be notified of that trigger condition if the filter circuitry also determines that a branch has been taken by the processing circuitry on encountering that identified program instruction due to a previous execution of the branch behaviour setting program instruction. This allows very specific behaviour of the processing circuitry to be monitored.

However, the events monitored by the filter circuitry need not relate to the use of such branch behaviour setting program instructions, but instead the filter control information within the filter circuitry can be programmed so as to monitor any desired events, for example a cache miss or other performance-related events such as resource conflicts, stalls, etc. The occurrence of such events will then be reported to the filter circuitry via the received event information, so that the filter circuitry can determine whether the qualifying condition is present or not.

The filter circuitry can be configured in a variety of different ways so as to prevent the trigger condition being notified to the trigger signal generation circuitry when the qualifying condition is not met. In one embodiment, the evaluation circuitry is arranged to issue an output signal indicating whether presence of the trigger condition has been determined, and the filter circuitry is arranged to receive said output signal and to generate a replacement output signal. In the presence of said qualifying condition the filter circuitry causes said replacement output signal to match said output signal, and in the absence of said qualifying condition, the filter circuitry causes said replacement output signal to indicate absence of the trigger condition. Hence, in such an embodiment, the filter circuitry selectively modifies the output signal from the evaluation circuitry dependent on whether the qualifying condition is met or not. In particular, in the absence of the qualifying condition, the filter circuitry will override the output signal from the evaluation circuitry so that the replacement output signal indicates absence of the trigger condition, irrespective of whether the trigger condition was detected by the evaluation circuitry or not.

In an alternative embodiment, the filter circuitry may be arranged to control an enable signal used by the evaluation circuitry. In particular, in one embodiment the filter circuitry is arranged to generate an enable signal for the evaluation circuitry which is asserted when the qualifying condition is present and which is deasserted when the qualifying condition is absent. The evaluation circuitry is arranged, when the enable signal is asserted, to perform the evaluation operation and to issue an output signal indicating whether presence of said trigger condition has been determined, but is arranged, when the enable signal is deasserted, such that the output signal indicates absence of the trigger condition. Hence, when the enable signal is deasserted by the filter circuitry, the evaluation circuitry output signal will indicate absence of the trigger condition, with the evaluation operation not being performed by the evaluation circuitry in such a situation.

As a yet further alternative, the filter circuitry may be arranged, in the absence of said qualifying condition, to modify one of the program instruction execution information and the evaluation information, such that the evaluation circuitry is prevented from determining presence of the trigger condition.

Whilst in one embodiment, on detecting that the qualifying condition is not present, the filter circuitry could modify the evaluation information to take a form that would not cause the trigger condition to be detected by the evaluation circuitry, whatever valid values the program instruction execution information takes, in an alternative embodiment the filter circuitry modifies the program instruction execution information before it is considered by the evaluation circuitry.

In particular, the filter circuitry may be arranged to selectively modify the program instruction execution information which is evaluated by the evaluation circuitry. In one embodiment, the filter circuitry is arranged to receive program instruction execution information as output by the processing circuitry and to generate replacement program instruction execution information for input to the evaluation circuitry. In the presence of said qualifying condition the filter circuitry causes said replacement program instruction execution information to match the program instruction execution information as output by the processing circuitry, and in the absence of said qualifying condition, the filter circuitry causes said replacement program instruction execution information to take a form which prevents the evaluation circuitry determining presence of the trigger condition. Hence, in such an embodiment, when the qualifying condition is absent, the filter circuitry may be arranged to modify the program instruction execution information so that it takes a form which it is known will not then enable a match to be detected by the evaluation circuitry when it performs its evaluation operation. For example, the received program instruction execution information may be modified so as to take illegal values which it is then known will not result in the trigger condition being detected by the evaluation circuitry when it performs its evaluation operation.

There are a number of ways in which the evaluation information and the filter control information may be provided for use by the evaluation circuitry and filter circuitry respectively. In one embodiment the apparatus further comprises storage which is configured to store the evaluation information and the filter control information. In one embodiment, the contents of the storage are programmable, for example by a user of a debugger application seeking to perform debug operations on a sequence of program instructions executed by the processing circuitry. Through use of both the evaluation information and the filter control information, very targeted behaviours can be monitored, allowing not only particular instruction execution behaviour to be monitored, but particular instances of that instruction execution behaviour that coincide with one or more other events taking place within the processing circuitry.

In one embodiment the apparatus further comprises at least one further evaluation circuitry, each further evaluation circuitry arranged to receive said program instruction execution information, and to perform an associated evaluation operation to determine with reference to associated evaluation information whether the program instruction execution information indicates presence of a further trigger condition. The trigger signal generation circuitry is then arranged to assert a trigger signal to the processing circuitry in dependence on whether at least one of said trigger condition and each said further trigger condition is determined to be present. Hence, trigger conditions from multiple evaluation circuits can be considered when determining whether it is appropriate to assert a trigger signal to the trigger signal generation circuitry.

In one embodiment, the apparatus further comprises at least one further filtering circuitry, each further filter circuitry being associated with a further evaluation circuitry, and arranged to receive said event information, and to determine with reference to associated filter control information and said event information whether a further qualifying condition is present. On determining that the further qualifying condition is absent, the further filter circuitry prevents the presence of the further trigger condition determined by the associated further evaluation circuitry being notified to the trigger signal generation circuitry.

In one embodiment, the apparatus further comprises combining circuitry arranged to receive a first input signal derived from an output signal issued by the evaluation circuitry, and a further input signal derived from an output signal issued by a further evaluation circuitry, and to perform a logical operation on said first and further input signals in order to generate a combined output signal provided to said trigger signal generation circuitry.

Hence, trigger conditions from multiple evaluation circuits can be logically combined when determining whether it is appropriate to assert a trigger signal to the trigger signal generation circuitry. Such an approach allows, for example, trigger conditions to be detected for a range of instruction addresses, data addresses or data values. However, again the filter circuitry can be used to qualify any such trigger conditions so that assertion of the trigger signal is made dependent on the presence of at least one event monitored by the filter circuitry. One or more of the further evaluation circuits may also be provided with an associated filtering circuit so that multiple evaluation circuits can then have their trigger conditions qualified by the operation of the associated filter circuitry.

The input signals received by the combining circuitry may correspond directly with the output signal issued by the associated evaluation circuits, but this will depend on how the filter circuitry is configured to modify the behaviour of the evaluation circuitry. For example, in one embodiment where the filter circuitry selectively modifies the output signals from the associated evaluation circuits, it will be appreciated that the input signals received by the combining circuitry may not directly correspond with the output signals issued by the associated evaluation circuits, due to the filtering functionality implemented by the associated filtering circuits.

The evaluation circuitry can take a variety of forms, but in one embodiment comprises comparison circuitry, said evaluation information comprises a match value, and the comparison circuitry is arranged to compare a selected portion of the program instruction execution information (for example the instruction address, the data address, or the data value) with the match value in order to determine whether the trigger condition is present.

In one embodiment, the filter control information identifies whether occurrence of at least one event is required to determine presence of the qualifying condition. Whilst the filter control information can restrict the qualifying condition to requiring one or more particular events to be present, in one embodiment there is also a setting of the filter control information available that effectively bypasses the filtering operation, allowing any occurrence of the trigger condition by the associated evaluation circuitry to be propagated on towards the trigger signal generation circuitry.

The trigger signal can take a variety of forms but in one embodiment is a watchpoint signal which, when asserted, indicates to the processing circuitry the presence of at least one watchpoint condition.

Particular embodiments will now be described with reference to the Figures.

FIG. 1 is a diagram illustrating a system in accordance with one embodiment. A processing element 10 is provided that is arranged to execute a sequence of program instructions, with program instruction execution information being output to monitoring circuitry 20 during the execution of those instructions. The program instruction execution information provides information that is a direct consequence of execution of a program instruction. For example, the program instruction execution information may identify an instruction address of the program instruction executed by the processing circuitry, an address of a data value accessed when executing that program instruction, and/or a data value accessed when executing that program instruction. In a further embodiment, a cycle count value could also be included within the program instruction execution information, for example as generated by a wrapping counter that maintains an N-bit counter value.

The monitoring circuitry 20 is arranged to monitor the program instruction execution information in order to determine when particular values are observed within that program instruction execution information, so as to allow a trigger signal to be issued over path 30 back to the processing element 10 when those values are observed. This can be useful in a variety of situations, for example when seeking to debug the program sequence being executed by the processing element 10.

The processing element 10 can take a variety of forms, but in one embodiment is a processor core arranged to execute a sequence of program instructions, with the monitoring circuitry being provided in association with the processor core to issue trigger signals to the processing element when certain program execution behaviour occurs as deduced from analysis of the program instruction execution information 25. In one embodiment, the monitoring circuitry takes the form of debug, watchpoint and trace (DWT) circuitry, which can be programmed with certain watchpoint values, and can then monitor for the presence of those watchpoint values within the program instruction execution information. The trigger signal may then take the form of a watchpoint signal which is asserted when a watchpoint condition as encoded by the various watchpoint values is detected. The monitoring circuitry 20 can also be arranged to encode particular breakpoint conditions, and the term watchpoint will be used herein to refer generally to both watchpoints and breakpoints.

For ease of illustration in FIG. 1, the monitoring circuitry 20 is shown as being separate to the processing element 10. However, in some embodiments there is no requirement for the monitoring circuitry 20 to be a physically discrete item to the processing element 10, and indeed in some processor cores the monitoring circuitry 20 may be provided within the processor core, for example being located towards the end of the execution pipeline of the processor core.

In accordance with the embodiments described herein, the processing element 10 is further arranged to issue event information over path 35 to the monitoring circuitry 20 so that certain trigger conditions that may be detected from analysis of the program instruction execution information can be filtered out if they do not coincide with one or more predetermined events being indicated by the event information.

The event information can take a variety of different forms, relating to events that are not directly defined by execution of the program instruction to which the associated program instruction execution information relates. A variety of architectural and micro-architectural events can be encoded within the event information, with filtering circuitry provided within the monitoring circuitry applying selective filtering of the trigger conditions detected from analysis of the program instruction execution information. This can hence enable assertion of the trigger signal to be associated with complex combinations of behaviour within the associated processing element 10 rather than being dependent solely on analysis of the program instruction execution information.

The event indications routed to the monitoring circuitry 20 over path 35 may hence for example indicate events that are not intended by, or not directly associated with, execution of particular program instructions for which associated program instruction execution information is being provided over path 25. These may for example be performance related events such as resource conflicts, stalls, etc. which may arise during the execution of certain instructions within the execution pipeline, or could be other performance impacting events such as a cache miss, for example a cache miss that may have occurred when prefetching an instruction from an instruction cache, or that may have occurred when seeking to access data specified by execution of a particular instruction. Through use of the filtering functionality of the monitoring circuitry provided by the described embodiments, based on the event indications routed over path 35, this enables the monitoring circuitry to not only look to observe particular instruction execution behaviour, such as an instruction at a particular address being executed, a data value at a particular address being accessed, or a particular data value being accessed, but also to qualify occurrences of such instruction execution behaviour so as to only assert trigger signals when that behaviour coincides with particular events. Hence, this would for example allow a trigger signal be asserted when execution of a particular instruction gave rise to a particular performance-impacting event.

As another example, the sequence of program instructions being executed by the processing element 10 may include one or more occurrences of a branch behaviour setting program instruction. Execution of such a branch behaviour setting program instruction can enable a branch behaviour to be associated with another program instruction identified by that branch behaviour setting program instruction, that other program instruction being referred to herein as the "identified program instruction". In addition to, or as an alternative to, the normal execution behaviour of that identified program instruction, if the branch behaviour is associated with that identified program instruction this will cause the processing circuitry to branch to a target address identified by the branch behaviour setting program instruction when the identified program instruction is encountered in the program sequence. This can hence enable branch behaviour to be associated with any arbitrary program instruction identified by the branch behaviour setting program instruction, which can give rise to performance benefits in certain scenarios.

The branch behaviour setting program instruction can take a variety of forms. In one embodiment it may be a branch-future instruction that can identify an arbitrary instruction appearing later in the program sequence, with which the branch behaviour is desired to be associated. When execution of the branch behaviour setting instruction causes the earlier-mentioned branch behaviour to be associated with the identified program instruction, then when that identified program instruction is later encountered, the branch behaviour can be invoked, instead of, or in addition to the normal execution behaviour of the identified program instruction. Another example of a branch behaviour setting program instruction is a final instruction that may be provided within a zero overhead loop. In this case, the identified program instruction can be the immediately preceding program instruction within the loop, and the target address can point to the start of the loop. During a first iteration, the branch behaviour setting program instruction at the end of the loop is executed in order to associate the branch behaviour with the penultimate instruction in the loop, such that on all subsequent iterations of the loop other than the final iteration, there is no need to re-execute the final instruction in the loop, since instead the branch behaviour is directly triggered on encountering the penultimate instruction in the loop, in addition to performing the normal instruction execution behaviour of that penultimate instruction. This can provide significant performance benefits.

It will be appreciated that when using such branch behaviour setting program instructions, the branch behaviour that becomes associated with the identified program instruction is not a behaviour that is deterministically associated with the identified program instruction itself, but instead is a behaviour that is associated with that identified program instruction by another program instruction, namely the branch behaviour setting program instruction. However, by using the combination of the monitoring of the program instruction execution information over path 25, and the monitoring of event indications over path 35, the monitoring circuitry can be set up so as to assert trigger signals for any instances of the identified program instruction that also give rise to the branch behaviour being observed as associated by the branch behaviour setting program instruction. This can hence provide a very useful tool when seeking to debug program sequences that incorporate such branch behaviour setting program instructions.

Figure 2:
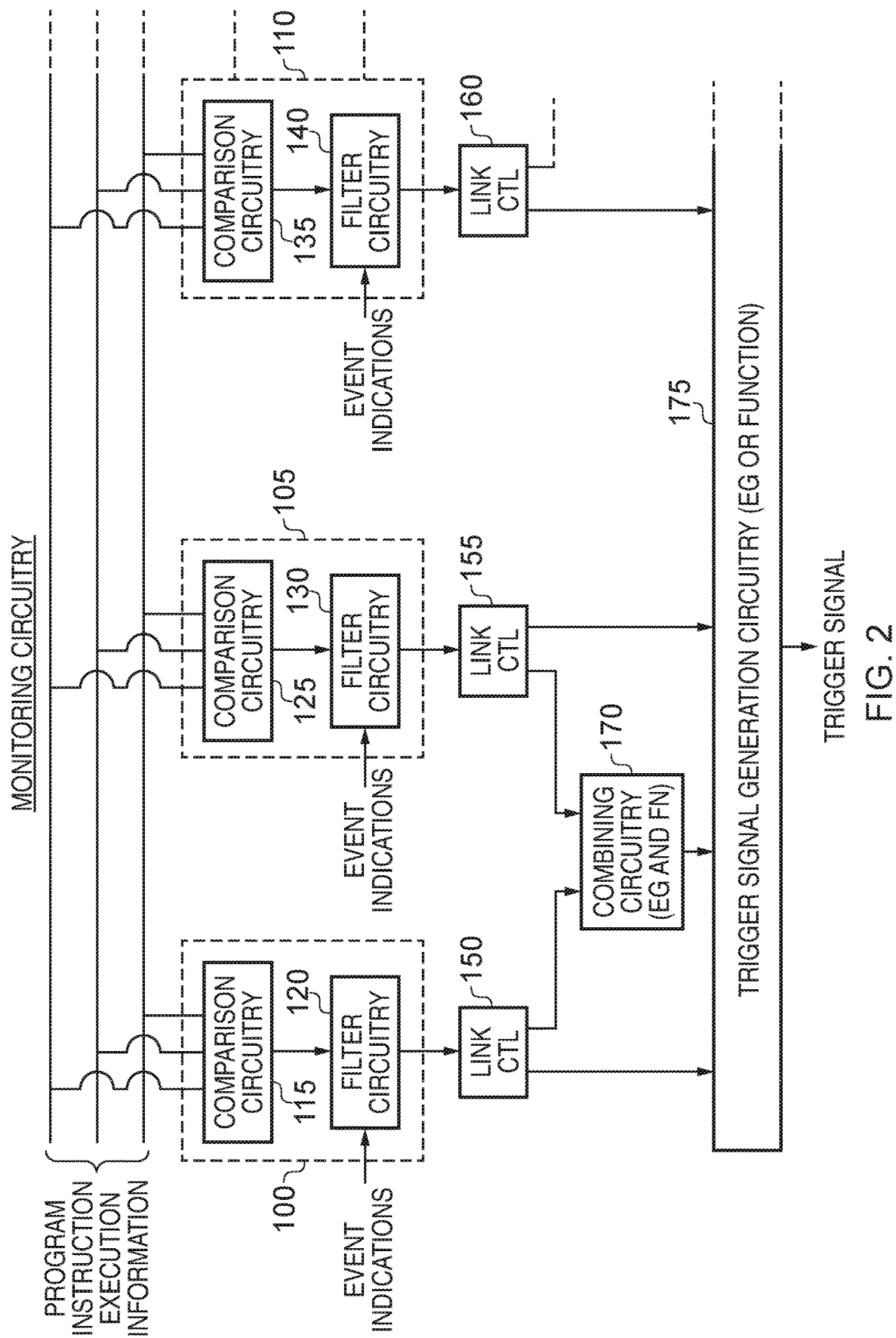
FIG. 2 is a block diagram illustrating components provided within the monitoring circuitry in accordance with one embodiment.

FIG. 2 is a block diagram illustrating in more detail the elements provided within the monitoring circuitry 20 of FIG. 1 in one embodiment. A plurality of comparison/filter blocks 100, 105, 110 are provided, each comparison/filter block including comparison circuitry 115, 125, 135 and filter circuitry 120, 130, 140. In the embodiments shown in FIG. 2 the program instruction execution information is fed directly to the various comparison circuits 115, 125, 135, and the event indications are provided as an input to the filter circuits 120, 130, 140. Each comparison circuitry can be configured to monitor a particular item of the program instruction execution information, and detect when a value of that item matches a match value pre-stored in association with the comparison circuit. When the value matches the match value, this causes a trigger condition to be detected by the comparison circuitry, and a signal will be output from the comparison circuitry indicating the presence of that trigger condition.

However, rather than that trigger condition output signal being forwarded directly to the downstream components 150, 155, 160, 170, 175 of the monitoring circuitry shown in FIG. 2, that signal is first processed by the filter circuitry 120, 130, 140. In particular, the filter circuitry can be arranged to qualify the onward propagation of the trigger condition signal from the associated comparison circuitry dependent on whether any associated event restriction is met. In particular, the various event indications passed over path 35 can be routed to each filter circuit, and the filter circuit can be configured so as to determine a qualifying condition to be present if a pre-specified event is determined to be present from the event indication information received. When the qualifying condition is present, the output from the comparison circuitry is merely propagated on to the remaining components within the monitoring circuitry. However, if the qualifying condition is not present, the trigger condition is not propagated, and instead the output from the filter circuitry indicates that no trigger condition has been identified.

In one embodiment, the outputs from the various filter circuits can be routed directly as inputs to the trigger signal generation circuitry 175 which can then be arranged to assert a trigger signal dependent on the received outputs from the filter circuits. In one embodiment, the trigger signal generation circuitry may simply implement an OR function so that the trigger signal is asserted if any of the outputs from the filter circuits are asserted (i.e. indicate detection of a trigger condition).

However, in one embodiment link control blocks 150, 155, 160 can be provided in order to enable the outputs from a pair of comparators to be linked. In particular, the link control elements 150, 155 can be arranged to route the outputs from the filter circuits 120, 130 to the combining circuitry 170, rather than routing those outputs directly to the trigger signal generation circuitry. Link control element 160 can be configured likewise in combination with another link control element associated with a further comparison/filter block, and another combining circuitry (not shown in the figure). The trigger signal generation circuitry then receives the output from the combining circuitry 170. The combining circuitry can perform a logical combination operation on the pair of inputs it receives from the link control blocks 150, 155, and in one embodiment can be arranged to perform an "AND" function on the two inputs. This allows a pair of comparison circuits to be arranged to detect when the received value for a predetermined item of program instruction execution information falls within a range. Hence for example the comparison circuitry 115 could issue a trigger signal when the received value is greater than a certain specified match value, whilst the comparison circuitry 125 may issue a trigger signal when the received value is less than another specified match value, whereby the combining circuitry 170 would assert a trigger signal whenever both conditions are met, i.e. where the received value falls within the specified range qualified by the two match values.

In accordance with the described embodiments, one or both of the filter circuits 120, 130 can also be arranged to apply filtering conditions to the outputs from the relevant comparison circuits so that the assertion of a trigger signal due to a value being detected within the range encoded by the comparison circuits can be made dependent on whether at least one event is also determined to be present.

The processing element 10 can be arranged to perform any required synchronisation operations so as to synchronise the propagation of the event indications over path 35 with the associated program instruction execution information being provided over path 25. It should further be noted that in some embodiments precise synchronisation may not be required. Indeed, many DWT watchpoint mechanisms already have an imprecise nature and any slippage due to the imprecise nature of such DWT watchpoint mechanisms when additionally using the event indications of the described embodiments would not be problematic, and indeed would be consistent with existing behaviour.

When a trigger signal is asserted from the trigger signal generation circuitry 175, the processing element 10 can react in a variety of ways. In one embodiment, it may be arranged to take an interrupt so as to cause a suitable exception handling routine to be performed in order to further analyse the program code.

Figure 3:
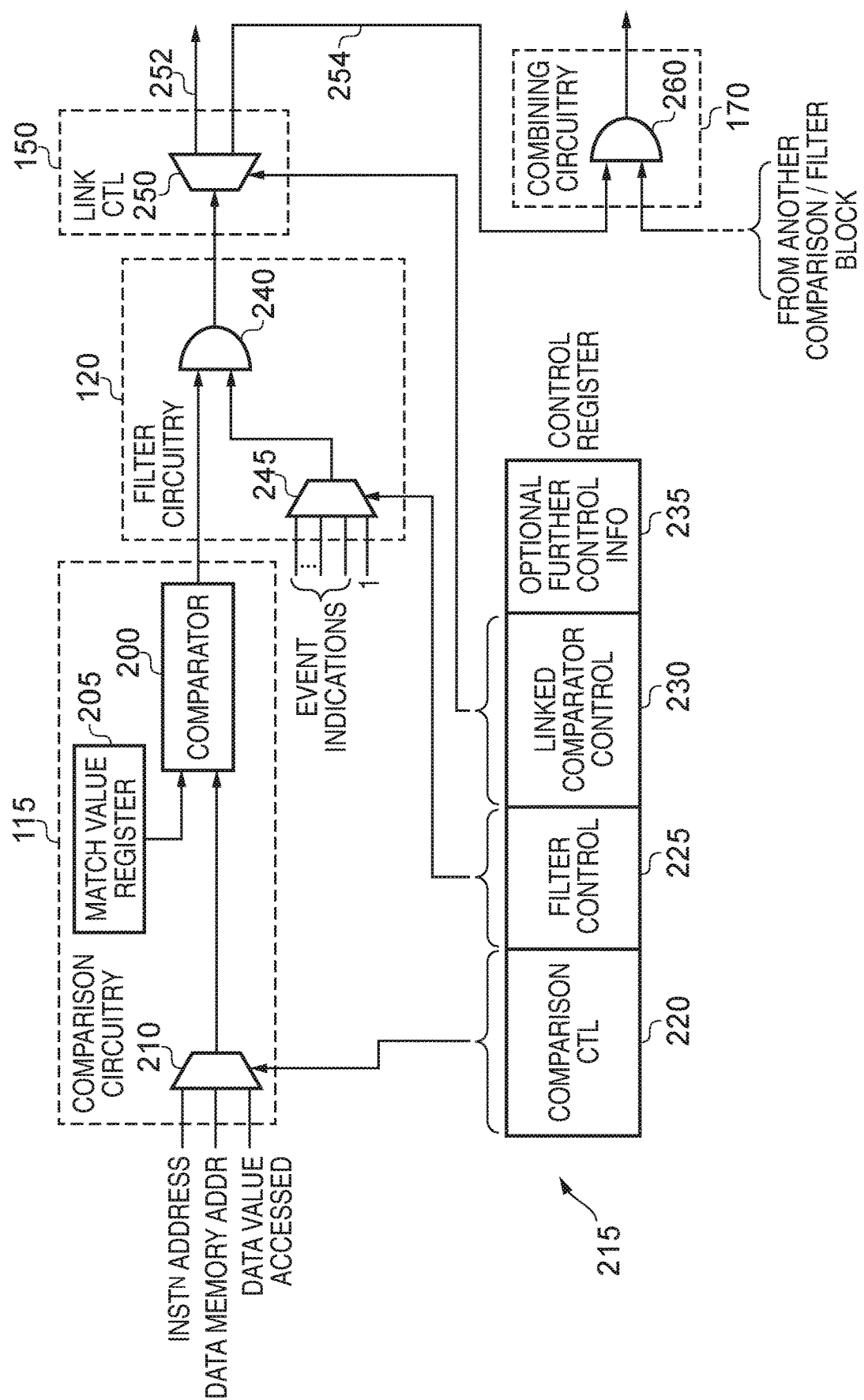
FIG. 3 is a diagram illustrating in more detail components provided within each comparison/filter block of the monitoring circuitry in accordance with one embodiment.

FIG. 3 is a block diagram illustrating in more detail components provided within each comparison/filter block, along with components which may be provided within any associated link control block or combining circuit. For the purposes of FIG. 3, the comparison circuitry 115 and filter circuitry 120 of FIG. 2 are considered, but in one embodiment each of the other comparison circuits 125, 135 and filter circuits 130, 140 are constructed in the same way. The comparison circuitry 115 includes a comparator 200 which receives the output from a multiplexer 210, and the output from a match value register 205. A control register 215 is provided with a number of fields for storing control information. In field 220 comparison control information is provided that is used to control the multiplexer 210, so as to route a desired item of the program instruction execution information to the comparator 200. For example, in one embodiment it may be arranged to forward the instruction address information to the comparator if the comparator is seeking to determine when a particular instruction is executed. The match value register 205 will then be programmed with a match value that is to be compared by the comparator which, considering the example just mentioned, could be a specific instruction address. When the output from the multiplexer 210 matches the match value in the register 205, a trigger condition signal is asserted at the output the comparator 200.

It should be noted that while in the example just discussed the comparator is looking for equality in the inputs, the comparator can also be arranged to perform other types of comparison, for example determining when the input from the multiplexer 210 is greater than the value in the register 205, or is less than the value in the register 205.

The filter circuitry 120 is arranged to receive the output signal from the comparator circuitry 200, and to qualify onward propagation of that signal to the link control block 150 dependent on the event indications received over path 35. In one embodiment, the filter circuitry includes an AND gate 240 which receives as one input the output signal from the comparator 200, and receives as another input the output signal from the multiplexer 245. The multiplexer 245 is arranged to receive the various event indication signals, and also in one embodiment has a further input set to a logic 1 value. Filter control information within the field 225 of the control register 215 can then be used to control the multiplexer 245 so as to select one of the inputs for output to the AND gate 240. When no filtering is required, the filter control information can cause the hardwired logic 1 input to the multiplexer 245 to be output to the AND gate 240, so that when the trigger condition is asserted at a logic 1 value at the output of the comparator, this is routed directly on to the link control block 150. However, alternatively the filter control information can identify a particular event, so that only when that event is present, and hence a logic 1 value is asserted on the associated event indication line, will the AND gate 240 allow an asserted trigger condition from the comparator to be propagated onto the link control block 150.

The link control block 150 can then be controlled by linked comparator control values within the field 230 of the control register 215. In particular, if the comparison circuitry 115 is not being linked with its adjacent comparison circuitry, then the value in the control field 230 will cause the link control demultiplexer 250 to output its input over path 252. Conversely, if the comparison circuitry 115 is being linked with its adjacent comparison circuitry 125, the value in the field 230 will cause the demultiplexer 250 to route the signal received as its input to the combining circuitry 170 over path 254. As mentioned earlier, in one embodiment the combining circuitry may merely take the form of an AND gate 260 so that the trigger condition is only asserted to the trigger signal generation circuitry if an asserted trigger condition is also received from the adjacent comparison/filter block 105.

If desired, the control register 215 may also optionally include further control information, collectively shown by the field 235 in FIG. 3. This control information can take a variety of forms, for example providing some information about how the associated comparison circuitry can be used, the data size associated with the items of program instruction execution information received, etc.

In FIG. 3, it is assumed that asserted signals have a logic 1 value and deasserted signals have a logic 0 value. However, it will be appreciated that the meaning of logic 1 and 0 values could be reversed, and the logic gates altered accordingly, if desired.

Figure 4:
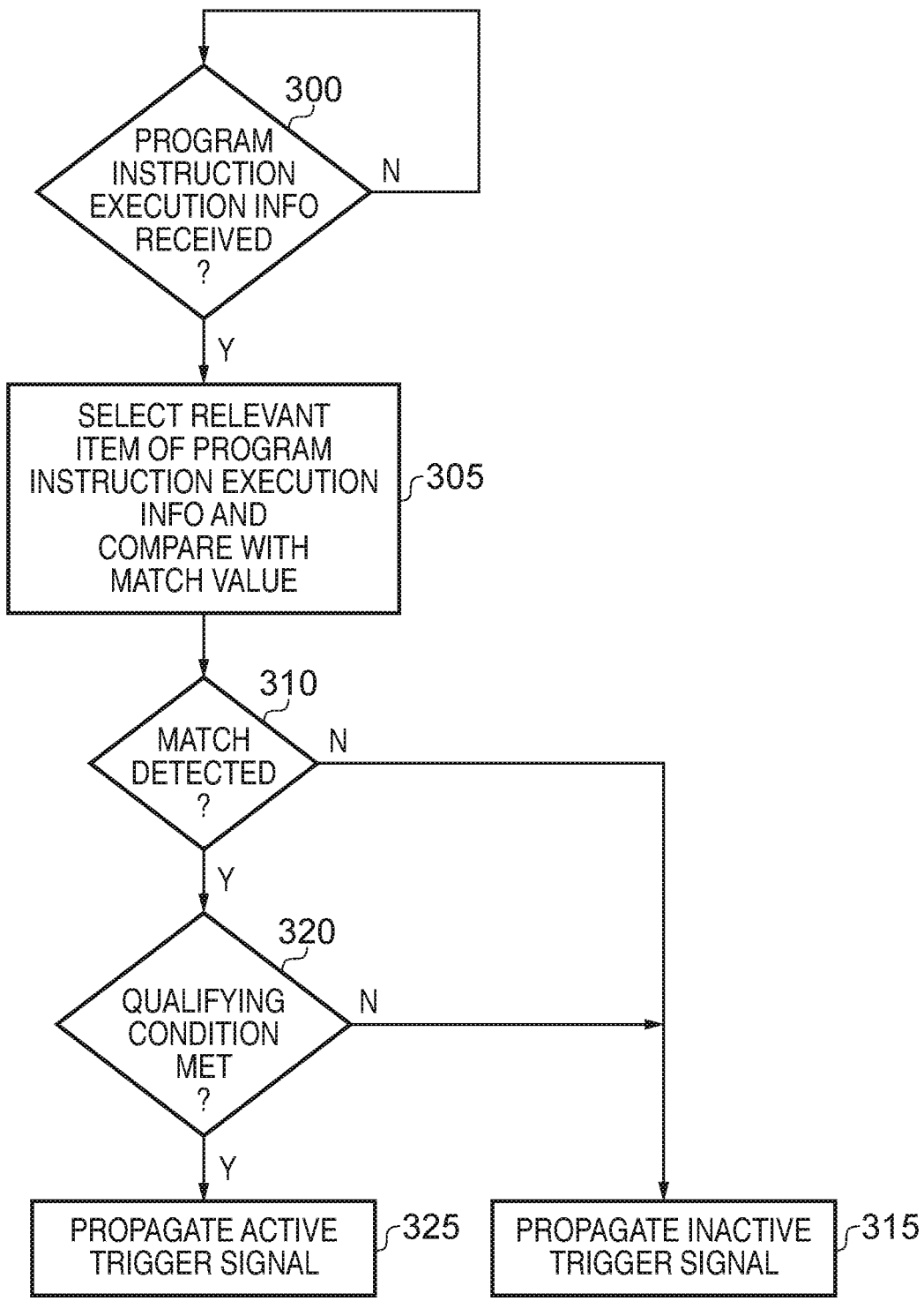
FIG. 4 is a flow diagram illustrating the operation of each comparison/filter block in accordance with one embodiment.

FIG. 4 is a flow diagram illustrating the operation of the circuitry of FIG. 3 in accordance with one embodiment. At step 300, receipt of the program instruction execution information is awaited, and on receipt a relevant item of the program instruction execution information is selected at step 305 (by the multiplexer 210 as controlled by the comparison control information 220) and that selected item is then compared by the comparator 200 with the match value in the register 205. If the comparison condition being looked for by the comparator 200 is determined to be present, referred to in FIG. 4 as a match being detected (see step 310), then the process proceeds to step 320, where it is then determined whether the qualifying condition is met. This is evaluated through control of the AND gate 240 by the output of the multiplexer 245. If the qualifying condition is met, then an active trigger signal is propagated at step 325, which in the embodiment of FIG. 3 will then be received by the link control block 150.

However, if a match is not detected at step 310, or if the match is detected but the qualifying condition is determined not to be met, the process proceeds to step 315 where an inactive trigger signal is propagated.

As will be apparent form the earlier discussion of FIG. 2, if desired any active or inactive trigger signal issued by a particular comparison/filter block at steps 325, 315 may be logically combined with the outputs from other comparisons/filter blocks in order to determine whether a trigger signal should be asserted back to the processing element 10 by the trigger signal generation circuitry 175.

Figure 5:
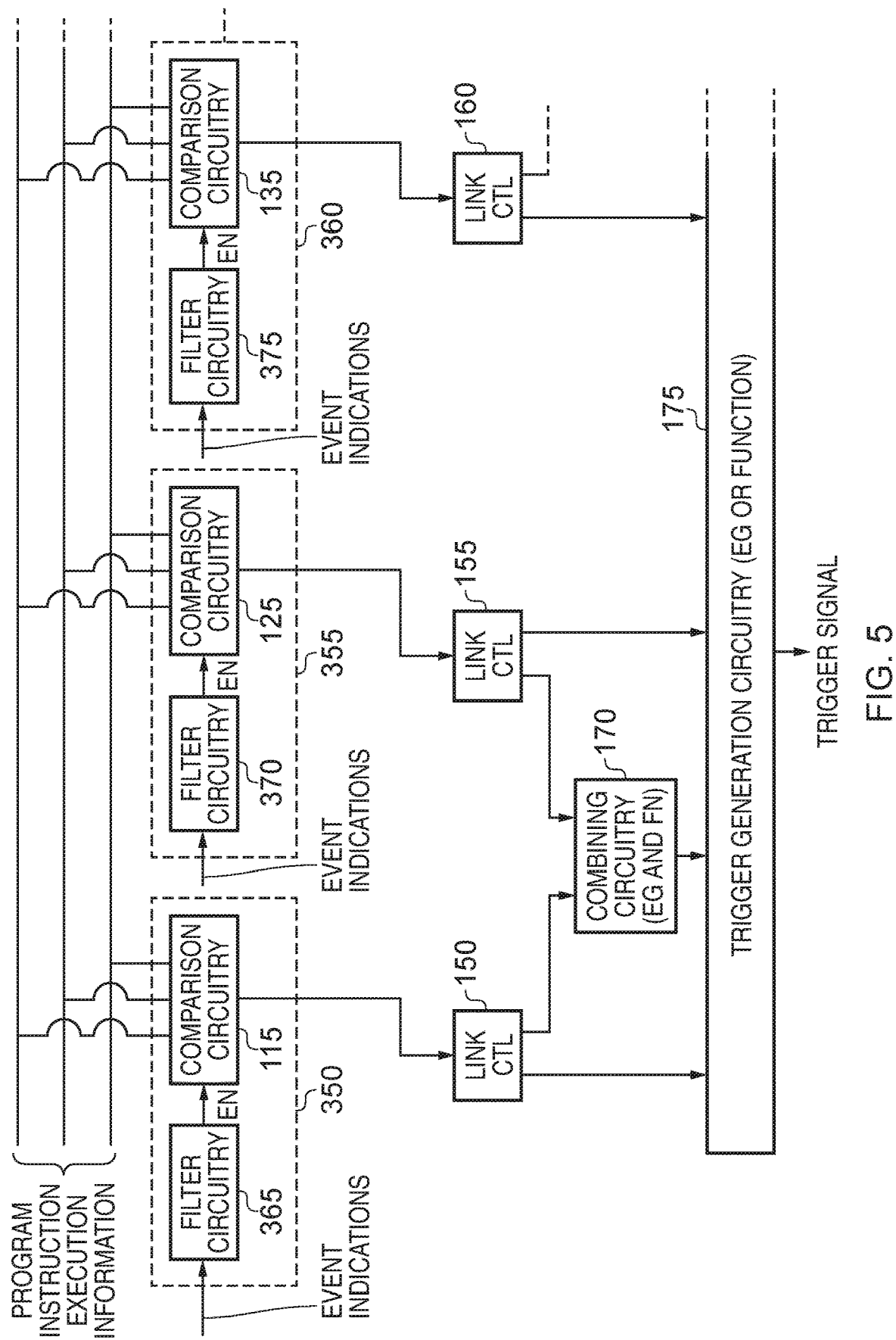
FIG. 5 is a diagram illustrating the arrangement of the monitoring circuitry in accordance with an alternative embodiment.
Figure 6:
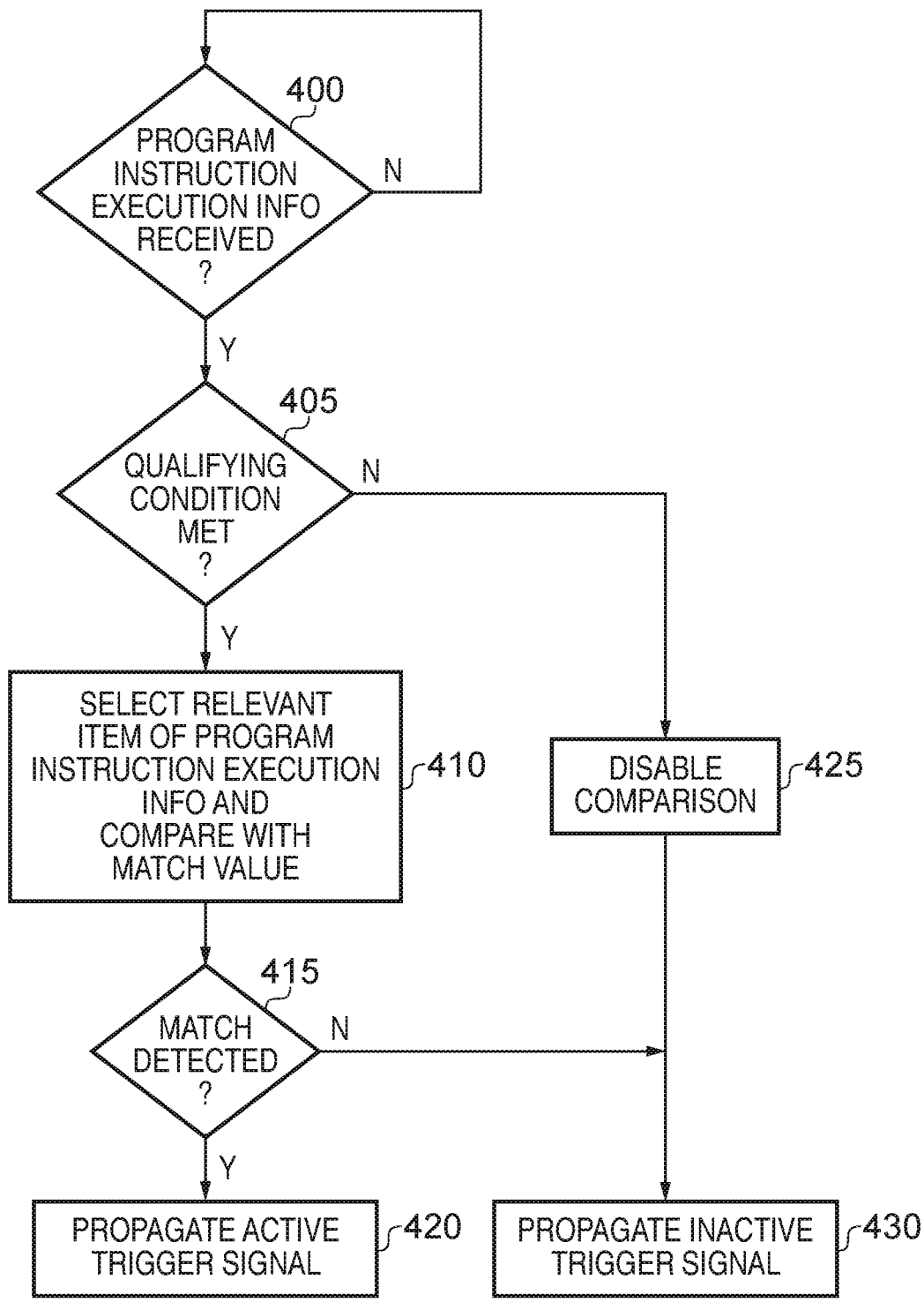
FIG. 6 is a flow diagram illustrating the operation of each comparison/filter block when using the monitoring circuitry of FIG. 5 in accordance with one embodiment.

FIG. 5 illustrates an alternative arrangement of monitoring circuitry that may be used. From a comparison of FIG. 5 with the earlier-discussed FIG. 2, it will be seen that the construction is very similar, but in this embodiment the filter circuits qualify an enable input to the comparison circuits, rather than performing a filtering operation on the outputs from the comparison circuits. Hence, in this embodiment each comparison/filter block 350, 355, 360 includes filter circuitry 365, 370, 375 which each receive the various event indications, and then generate an enable signal for the associated comparison circuits 115, 125, 135. The operation of each comparison/filter block will now be discussed with reference to the flow diagram of FIG. 6.

At step 400, program instruction execution information is awaited, and on receipt the filter circuitry then determines at step 405 whether the qualifying condition is met, through evaluation of the various event indications. If the qualifying condition is not met, then the enable signal to the comparison circuitry is not asserted, thereby disabling the comparison operation at step 425 that would otherwise be performed by the comparison circuitry. As a result, the output signal from the comparison circuitry is maintained in an unasserted state, causing an inactive trigger signal to be propagated at step 430.

If at step 405 it is determined that the qualifying condition is met, then at step 410 the comparison circuitry selects the relevant item of program instruction execution information and compares it with the match value, whereafter at step 415 it is determined whether a match has been detected. If not, then an inactive trigger signal is propagated at step 430, but in the presence of a match condition an active trigger signal is propagated at step 420.

Figure 7:
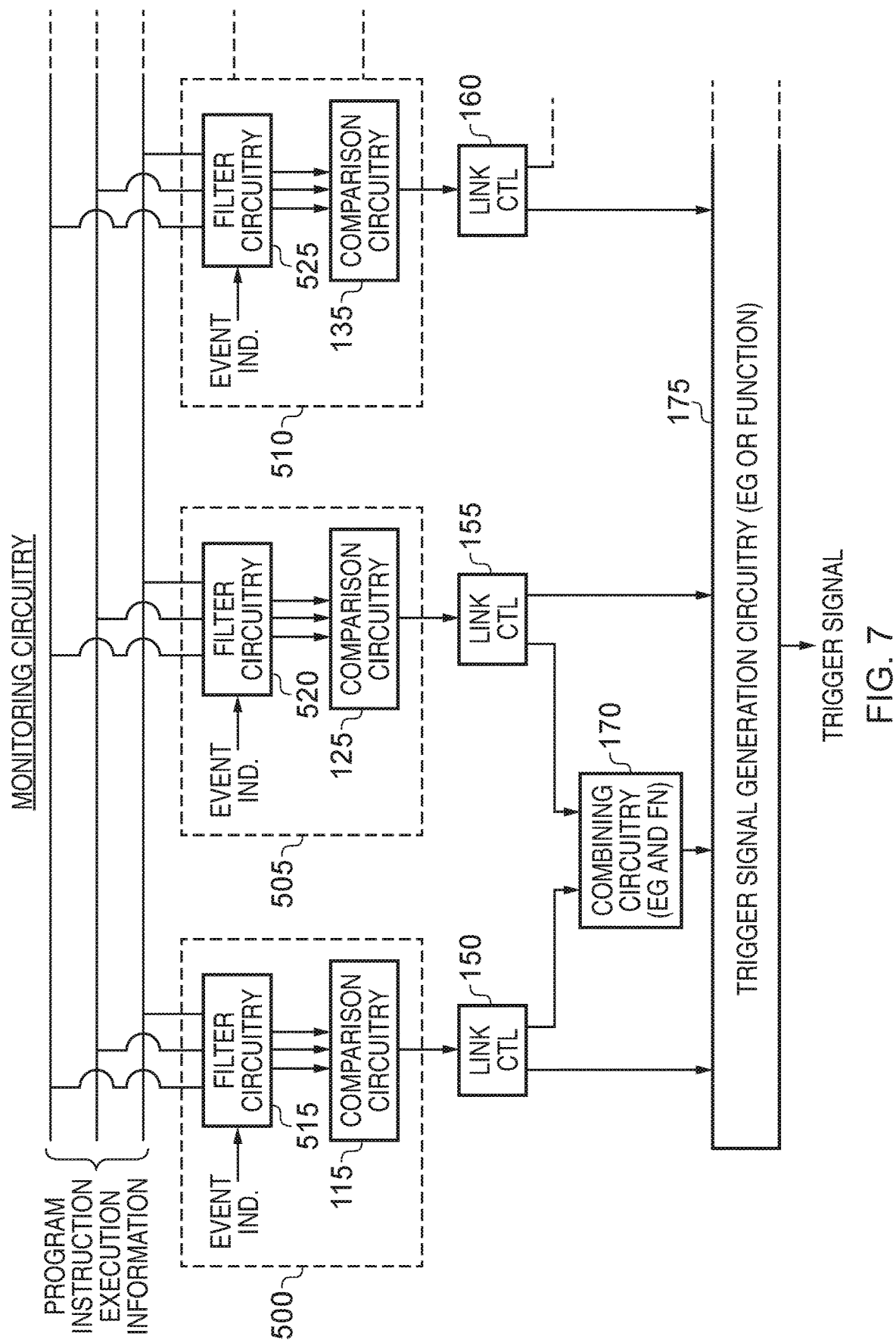
FIG. 7 is a diagram illustrating the arrangement of the monitoring circuitry in accordance with a yet further alternative embodiment.
Figure 8:
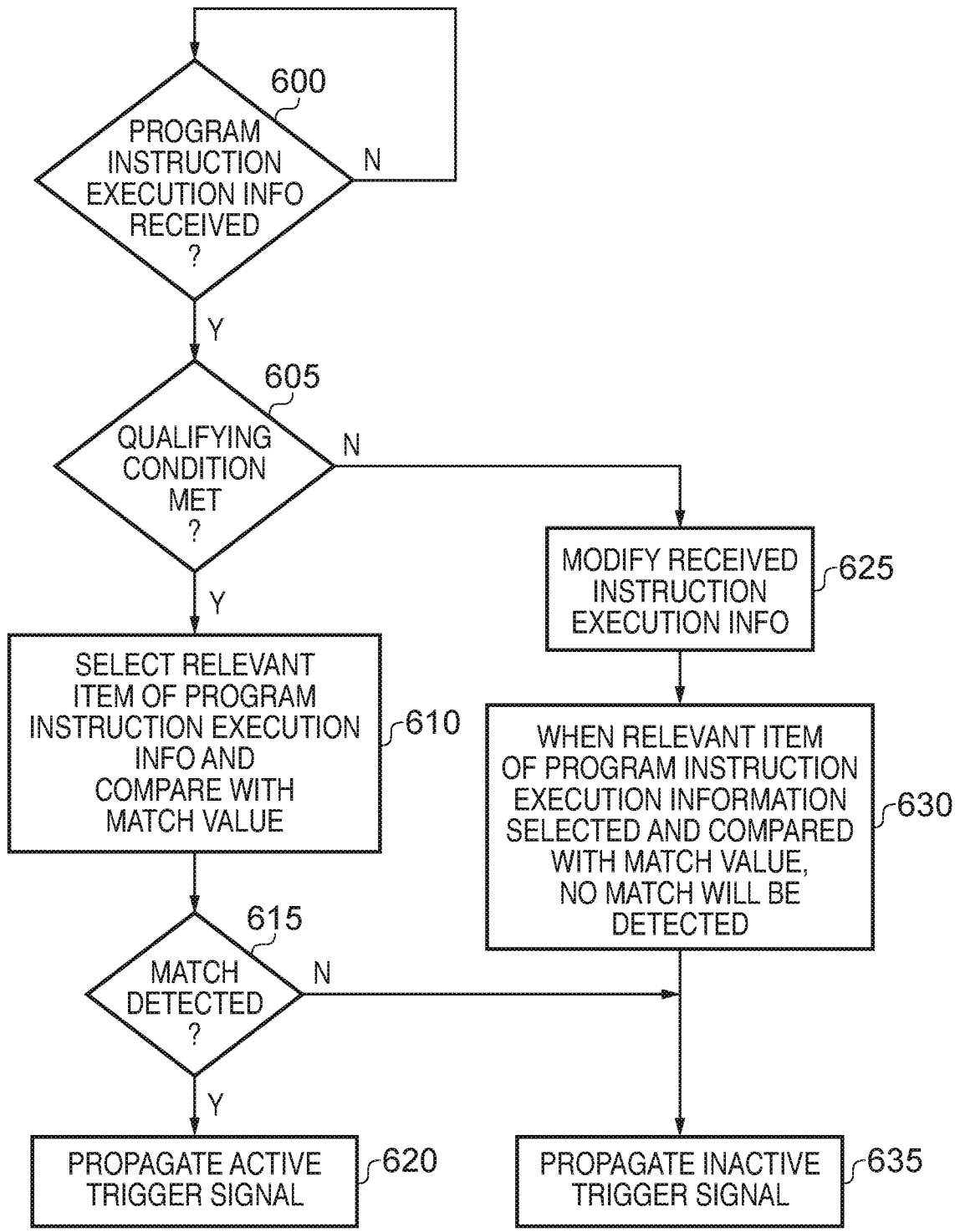
FIG. 8 is a flow diagram illustrating the operation of each comparison/filter block when using the monitoring circuitry of FIG. 7 in accordance with one embodiment.

FIG. 7 illustrates a yet further alternative embodiment where the filter circuitry is used to act on the received program instruction execution information prior to it being subjected to a comparison operation by the associated comparison circuitry. Hence, each comparison/filter block 500, 505, 510 includes filter circuitry 515, 520, 525 that receives the program instruction execution information, and selectively modifies that information prior to providing it to the associated comparison circuitry 115, 125, 135. The operation of each comparison/filter block in such an embodiment will now be discussed with reference to FIG. 8.

At step 600, the program instruction execution information is awaited, and upon receipt the filter circuitry then determines at step 605 whether the qualifying condition is met by analysis of the received event indications. If it is, then at step 610 the program instruction execution information is forwarded unaltered to the comparison circuitry, where the comparison circuitry then selects the relevant item of program instruction execution information and compares it with the match value. If a match is then detected at step 615, an active trigger signal is propagated at step 620, whereas otherwise an inactive trigger signal is propagated at step 635.

If at step 605 the filter circuitry determines that the qualifying condition is not met, then at step 625 the filter circuitry modifies the received instruction execution information in some predetermined manner. In particular, the aim is for the filter circuitry to modify the program instruction execution information so that it then takes a form that cannot result in a match being detected by the associated comparison circuitry. For example, there may be certain illegal values for the program instruction execution information, and the filter circuitry could set the program instruction execution information to those illegal values at step 625.

At step 630, when the comparison circuitry then receives the modified instruction execution information, it selects the relevant item of program instruction information and compares it with the match value in the usual way, but due to the modification that has been performed on the instruction execution information no match will be detected. As a result, the process will proceed to step 635 where an inactive trigger signal is propagated.

From the above described embodiments, it can be seen that through the use of the filter circuitry of the described embodiments, the operation of the associated comparison circuits can be qualified. Thus, if a comparator matches during its normal operation (for example based on program counter value, data address value or data value match), it will only issue an asserted trigger condition if the associated event filter condition is also determined to be present. If the event filter condition is not present, then an asserted trigger condition from the associated comparator is suppressed. In one embodiment, to allow the filter functionality to be turned off if desired, the filter control information can be set so as to effectively apply no filtering of the output from the comparison circuits.

As also described, it is possible to combine the filtering functionality with linked comparators. For example, if one of the comparators in a linked pair is filtered on an event, the entire watchpoint triggering is conditioned upon that event. This would allow, for example, triggering a watchpoint for any specified event occurring within an address range.

It is also possible to add a filtering condition to both comparators within a linked pair such that the corresponding watchpoint will only be triggered if the comparator conditions and both events match. If the chosen events are different, the watchpoint will only trigger when all of those events are active at the same time. This would allow, for example, triggering a watchpoint whenever two events coincide within an address range, for example if an implicit branch occurs at the same time as a cache miss event within a particular range of instruction addresses. This enables very sophisticated condition filtering at low cost.

As a particular example use case, consider the following segment of code:
0x1000 BFX Rn@0x100C→???
0x1004 . . .
0x1008 . . . [branch future triggered branch occurs here in parallel]
0x100C . . .
. . .
0x1054 BX Rn In this example, execution of the branch-future (BFX) instruction sets up a future branch associated with instruction address 0x100C, where the branch is to an unknown location that is contained within register Rn. The corresponding branch, if taken, occurs in parallel with execution of the instruction at 0x1008 (i.e. in this embodiment occurs as the program counter is updated to 0x100C but before execution of the instruction at that address). If the branch is not taken (the implementation is free to choose whether to take this branch or not) a fallback path is followed that contains potentially many instructions which may or may not terminate with a corresponding branch instruction.

Suppose a programmer wishes to debug this code as it is behaving in an undesirable manner. This would require setting a breakpoint at addresses 0x1008 and 0x1054 to gain the necessary insight. However, the breakpoint at 0x1008 is only necessary if the branch set up by the branch-future instruction is taken.

The proposed DWT extensions described herein allow this to be done by setting a normal breakpoint on address 0x1054, and a breakpoint on address 0x1008 that will only trigger if the branch behaviour established by the BFX instruction also occurs at that location. Alternatively, a pair of comparators could be used to break for any such branch-future triggered branch within address range 0x1000-0x1054, which could allow the programmer to identify branch-future triggered branch granule problems (e.g. if as a result of an invalid program, a rogue branch-future triggered branch occurs at an unexpected location).

From the above described embodiments, it will be appreciated that the filtering functionality can be incorporated within the monitoring circuitry at a very small cost. For example, considering a situation where the monitoring circuitry is DWT circuitry located at the end of a core pipeline, this will already have the capability of matching addresses and data values. From a review of FIG. 3, it will be appreciated that to incorporate the additional filter circuitry, it is merely necessary to add a simple logic function, such as the AND gate 240 with an associated multiplexer 245 that is controlled by some additional bits 225 within the control register 215. The number of bits required within the field 225 will depend on the number of event indications being monitored, but in one embodiment may merely require two additional bits within the control register 215. It is then merely necessary to provide additional signals from the core to the DWT providing the event indications if those signals are not already present. This could for example involve single-bit wires per event. As mentioned earlier, a delay mechanism might also be implemented within the processing element 10 to cause the event information to coincide with the associated program instruction information when received by the monitoring circuitry 20.

As mentioned earlier, by combining such filtering functionality with the comparison functionality, this allows complex combinations of behaviour to be monitored within the processing element 10, hence giving program developers and the tools they use an improved ability to diagnose problems within their programs.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
evaluation circuitry to receive program instruction execution information indicative of a program instruction that has been executed by processing circuitry, and to perform an evaluation operation to determine with reference to evaluation information whether the program instruction execution information indicates presence of a trigger condition;
trigger signal generation circuitry to assert a trigger signal to the processing circuitry in dependence on whether said trigger condition is determined to be present; and
filter circuitry to receive event information indicative of at least one event occurring within the processing circuitry, and to determine with reference to filter control information and said event information whether a qualifying condition is present;
the filter circuitry being arranged, on determining that the qualifying condition is absent, to prevent the presence of the trigger condition being notified to the trigger signal generation circuitry;
wherein:
the at least one event indicated by the event information excludes events directly defined by execution of the program instruction;
the processing circuitry is arranged to execute a sequence of program instructions, said sequence including a branch behaviour setting program instruction that indicates an identified program instruction within said sequence, execution of the branch behaviour setting program instruction controlling how the processing circuitry processes the identified program instruction by enabling a branch behaviour to be associated with said identified program instruction, such that when the branch behaviour is associated with the identified program instruction as a result of execution of the branch behaviour setting program instruction, the processing circuitry is arranged, when the identified program instruction is encountered in said sequence, to branch to a target address identified by the branch behaviour setting program instruction in addition to, or as an alternative to, implementing normal execution behaviour of the identified program instruction; and
an event indicated by the event information identifies when a branch has been taken by the processing circuitry on encountering said identified program instruction due to a previous execution of the branch behaviour setting program instruction.

2. An apparatus as claimed in claim 1, wherein:
said evaluation circuitry is arranged to issue an output signal indicating whether presence of said trigger condition has been determined; and
said filter circuitry is arranged to receive said output signal and to generate a replacement output signal, in the presence of said qualifying condition the filter circuitry causing said replacement output signal to match said output signal, and in the absence of said qualifying condition, the filter circuitry causing said replacement output signal to indicate absence of the trigger condition.

3. An apparatus as claimed in claim 1, wherein:
said filter circuitry is arranged to generate an enable signal for the evaluation circuitry which is asserted when the qualifying condition is present and which is deasserted when the qualifying condition is absent;
said evaluation circuitry is arranged, when the enable signal is asserted, to perform the evaluation operation and to issue an output signal indicating whether presence of said trigger condition has been determined; and
the evaluation circuitry is arranged, when the enable signal is deasserted, such that the output signal indicates absence of the trigger condition.

4. An apparatus as claimed in claim 1, further comprising:
memory configured to store the evaluation information and the filter control information.

5. An apparatus as claimed in claim 1, further comprising:
at least one further evaluation circuitry, each further evaluation circuitry arranged to receive said program instruction execution information, and to perform an associated evaluation operation to determine with reference to associated evaluation information whether the program instruction execution information indicates presence of a further trigger condition; and
the trigger signal generation circuitry is arranged to assert a trigger signal to the processing circuitry in dependence on whether at least one of said trigger condition and each said further trigger condition is determined to be present.

6. An apparatus as claimed in claim 5, further comprising:
at least one further filtering circuitry, each further filter circuitry being associated with a further evaluation circuitry;

each further filter circuitry arranged to receive said event information, and to determine with reference to associated filter control information and said event information whether a further qualifying condition is present, and on determining that the further qualifying condition is absent, to prevent the presence of the further trigger condition determined by the associated further evaluation circuitry being notified to the trigger signal generation circuitry.

7. An apparatus as claimed in claim 5, further comprising combining circuitry arranged to receive a first input signal derived from an output signal issued by the evaluation circuitry, and a further input signal derived from an output signal issued by a further evaluation circuitry, and to perform a logical operation on said first and further input signals in order to generate a combined output signal provided to said trigger signal generation circuitry.

8. An apparatus as claimed in claim 1, wherein said program instruction execution information provides at least one of:
 an instruction address of the program instruction executed by the processing circuitry;
 an address of a data value accessed when executing the program instruction; and
 a data value accessed when executing the program instruction.

9. An apparatus as claimed in claim 1, wherein the at least one event indicated by the event information comprises at least one performance-related event.

10. An apparatus as claimed in claim 9, wherein said at least one performance-related event comprises at least a cache miss event.

11. An apparatus as claimed in claim 1, wherein said evaluation circuitry comprises comparison circuitry, said evaluation information comprises a match value, and the comparison circuitry is arranged to compare a selected portion of the program instruction execution information with the match value in order to determine whether the trigger condition is present.

12. An apparatus as claimed in claim 1, wherein the filter control information identifies whether occurrence of at least one event is required to determine presence of the qualifying condition.

13. An apparatus as claimed in claim 1, wherein said trigger signal is a watchpoint signal which, when asserted, indicates to the processing circuitry the presence of at least one watchpoint condition.

14. A method of operating an apparatus to control assertion of a trigger signal to processing circuitry, comprising:
 receiving program instruction execution information indicative of a program instruction that has been executed by the processing circuitry, and performing an evaluation operation to determine with reference to evaluation information whether the program instruction execution information indicates presence of a trigger condition;
 asserting a trigger signal to the processing circuitry in dependence on whether said trigger condition is determined to be present;
 receiving event information indicative of at least one event occurring within the processing circuitry, and determining with reference to filter control information and said event information whether a qualifying condition is present; and
 on determining that the qualifying condition is absent, preventing the presence of the trigger condition being taken into account when determining whether to assert the trigger signal;
wherein:
the at least one event indicated by the event information excludes events directly defined by execution of the program instruction;
a sequence of program instructions are executed by the processing circuitry, said sequence including a branch behaviour setting program instruction that indicates an identified program instruction within said sequence, execution of the branch behaviour setting program instruction controlling how the processing circuitry processes the identified program instruction by enabling a branch behaviour to be associated with said identified program instruction, such that when the branch behaviour is associated with the identified program instruction as a result of execution of the branch behaviour setting program instruction, the processing circuitry is arranged, when the identified program instruction is encountered in said sequence, to branch to a target address identified by the branch behaviour setting program instruction in addition to, or as an alternative to, implementing normal execution behaviour of the identified program instruction; and
an event indicated by the event information identifies when a branch has been taken by the processing circuitry on encountering said identified program instruction due to a previous execution of the branch behaviour setting program instruction.

15. An apparatus, comprising:
evaluation circuitry to receive program instruction execution information indicative of a program instruction executed by processing circuitry, and to perform an evaluation operation to determine with reference to evaluation information whether the program instruction execution information indicates presence of a trigger condition;
trigger signal generation circuitry to assert a trigger signal to the processing circuitry in dependence on whether said trigger condition is determined to be present; and
filter circuitry to receive event information indicative of at least one event occurring within the processing circuitry, and to determine with reference to filter control information and said event information whether a qualifying condition is present;
the filter circuitry being arranged, on determining that the qualifying condition is absent, to prevent the presence of the trigger condition being notified to the trigger signal generation circuitry;
wherein:
said filter circuitry is arranged, in the absence of said qualifying condition, to modify one of the program instruction execution information and the evaluation information, such that the evaluation circuitry is prevented from determining presence of the trigger condition.

16. An apparatus as claimed in claim 15, wherein:
said filter circuitry is arranged to receive the program instruction execution information as output by the processing circuitry and to generate replacement program instruction execution information for input to the evaluation circuitry;
in the presence of said qualifying condition the filter circuitry causing said replacement program instruction execution information to match the program instruction execution information as output by the processing circuitry, and in the absence of said qualifying condition, the filter circuitry causing said replacement program instruction execution information to take a form which prevents the evaluation circuitry determining presence of the trigger condition.

\* \* \* \* \*